US010065804B1

(12) United States Patent
Jiang et al.

(10) Patent No.: US 10,065,804 B1
(45) Date of Patent: Sep. 4, 2018

(54) CHAIN FAULT DIAGNOSIS SYSTEM AND METHOD FOR SCRAPER CONVEYOR

(71) Applicant: CHINA UNIVERSITY OF MINING AND TECHNOLOGY, Jiangsu (CN)

(72) Inventors: Fan Jiang, Jiangsu (CN); Zhencai Zhu, Jiangsu (CN); Wei Li, Jiangsu (CN); Sunyang Wu, Jiangsu (CN); Gongbo Zhou, Jiangsu (CN); Guohua Cao, Jiangsu (CN); Yuxing Peng, Jiangsu (CN); Hao Lu, Jiangsu (CN); Chunli Hua, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 15/571,045

(22) PCT Filed: Dec. 7, 2016

(86) PCT No.: PCT/CN2016/108843
§ 371 (c)(1),
(2) Date: Nov. 1, 2017

(87) PCT Pub. No.: WO2017/197874
PCT Pub. Date: Nov. 23, 2017

(30) Foreign Application Priority Data

May 17, 2016 (CN) .......................... 2016 1 0327486

(51) Int. Cl.
*B65G 43/06* (2006.01)
*B65G 19/08* (2006.01)
(Continued)

(52) U.S. Cl.
CPC ............ *B65G 43/06* (2013.01); *G01L 1/2218* (2013.01); *G01L 1/2281* (2013.01); *B65G 19/08* (2013.01); *B65G 19/22* (2013.01)

(58) Field of Classification Search
CPC ..... G01L 1/2218; G01L 1/2281; B65G 43/06; B65G 19/22; B65G 19/06; B65G 19/08; B65G 19/10; B65G 23/06
See application file for complete search history.

(56) References Cited

U.S. PATENT DOCUMENTS

| 4,114,429 A * | 9/1978 | Clark .................... G01L 1/2206 340/690 |
| 4,646,912 A | 3/1987 | Houck et al. |
| 2013/0015043 A1 * | 1/2013 | Tout ....................... B65G 23/44 198/810.04 |

FOREIGN PATENT DOCUMENTS

| CN | 102180341 | 9/2011 |
| CN | 103434816 | 12/2013 |

(Continued)

*Primary Examiner* — Mark A Deuble
(74) *Attorney, Agent, or Firm* — JCIPRNET

(57) ABSTRACT

A chain fault diagnosis system and a chain fault diagnosis method for a scraper conveyor are provided. The diagnosis system includes a strain rosette attached on a top end surface of each sprocket tooth of the scraper conveyor. The strain rosette is connected to a signal gathering unit fixed on a scraper conveyor roller through a shielded conductor, the signal gathering unit sends a gathered signal to a wireless receiving device by means of wireless transmission, and the wireless receiving device transmits the gathered signal obtained thereby to an industrial control computer through a USB interface. The diagnosis method includes the following three steps: chain dislocation/skip fault judgment, chain breakage fault judgment and chain seizure fault judgment. A comprehensive monitoring of the chain state of the scraper conveyor is performed by measuring strain magnitudes in different directions of the sprocket tooth in real-time, transmitting the gathered signal to the industrial control computer via a wireless transmission method and dynamically diagnosing the faults of seizure, dislocation, skip and breakage (Continued)

of the scraper conveyor chain based on the obtained strain data.

4 Claims, 1 Drawing Sheet

(51) Int. Cl.
    *G01L 1/22*           (2006.01)
    *B65G 19/22*         (2006.01)

(56) References Cited

FOREIGN PATENT DOCUMENTS

| | | | | |
|---|---|---|---|---|
| CN | 104229427 | 12/2014 | | |
| CN | 105480671 | 4/2016 | | |
| CN | 105858126 | 8/2016 | | |
| GB | 2077212 A | * 12/1981 | ............. | B65G 23/44 |
| WO | WO-2016045389 A1 | * 3/2016 | ............. | B65G 43/06 |

* cited by examiner

CHAIN FAULT DIAGNOSIS SYSTEM AND METHOD FOR SCRAPER CONVEYOR

CROSS-REFERENCE TO RELATED APPLICATION

This application is a 371 application of the International PCT application serial no. PCT/CN2016/108843, filed on Dec. 7, 2016, which claims the priority benefit of China application no. 201610327486.9, filed on May 17, 2016. The entirety of each of the above-mentioned patent applications is hereby incorporated by reference herein and made a part of this specification.

BACKGROUND OF THE INVENTION

1. Field of the Invention

The invention relates to the technical field of health monitoring and safety guarantee of scraper conveyors, especially to a chain fault diagnosis system and a chain fault diagnosis method for a scraper conveyor.

2. Description of Related Art

Scraper conveyor is one of the important production and transportation equipment for a fully mechanized coal mining face in a coal mine well, playing important roles of transporting coal, providing a supporting point for movement of a hydraulic support and providing a walking track for a coal mining machine, the reliability of which have a direct influence on the safe and efficient production of a modern coal mine. The scraper chain is a mechanism prone to faults the most in the scraper conveyor. The faults of the scraper chain account for approximately 40% of the total faults of the scraper conveyor. In case of chain dislocation of the scraper conveyor, the scraper gets inclined and leads to chain breakage or scraper conveyor damage in severe cases. Once chain breakage or other faults occur, a long period of time is required for maintenance, which greatly restrains the production efficiency of large Chinese coal mines.

In China and other countries, the chain tension of the scraper conveyor is mainly obtained indirectly through the oil cylinder pressure, the chain suspension, the power, etc. During the operating process of the scraper conveyor, the chain may swing, and thus it is difficult to accurately measure the chain suspension. Through the oil cylinder pressure, only the total tension of the two chains of the scraper conveyor can be obtained, and it is difficult to detect faults like chain breakage. The existing scraper conveyor state detection mostly focuses on chain breakage fault, and cannot simultaneously monitor for chain dislocation, skip and seizure faults. For example, in a utility patent numbered as ZL 201410503491.1, a chain breakage fault detection is realized by installing a stress sensor on the sprocket tooth surface contacting the chain. Since the sensor contacts the chain and slides relatively, there is a possibility of abrasion and failure, and it is hard to detect the chain seizure, dislocation and skip faults. In invention utility patent numbered as ZL201110052986.3, a chain breakage fault caused by a chain inclination of the scraper conveyor can be predicted and detected through the electromagnetic induction principle. The detection result is highly interfered by the environment, and the chain seizure and dislocation faults cannot be diagnosed.

SUMMARY OF THE INVENTION

This invention aims to overcome the deficiencies of the existing technology, provide a chain fault diagnosis system and a chain fault diagnosis method for a scraper conveyor, and solve the problem that it is difficult to realize real-time detection to the chain seizure, breakage, dislocation and skip faults of the scraper conveyor.

In order to achieve the above objective, the invention adopts the following technical scheme: a chain fault diagnosis system for a scraper conveyor including a scraper conveyor roller and two sprockets, which are, as double-row gears, arranged at intervals on the scraper conveyor roller, and on each of which a chain is installed; the diagnosis system includes a strain rosette attached on the top end surface of the sprocket teeth of the scraper conveyor, wherein the strain rosette is connected with a signal gathering unit fixed on the roller of the scraper conveyor through a shielded conductor, the wireless transmission module of the signal gathering unit sends a gathered signal to a wireless receiving device by means of wireless transmission, and the wireless receiving device transmits the gathered signal obtained to an industrial control computer through a USB interface;

The strain rosette includes a 90° strain gauge arranged in parallel with the central axis of the sprockets and a 0° strain gauge arranged vertically to the 90° strain gauge.

Preferably, the signal gathering unit includes a power module which is connected to a signal conditioning circuit, an MCU micro-control chip and a wireless transmission module respectively, wherein the MCU micro-control chip is connected to the signal conditioning circuit, a storage module and the wireless transmission module respectively.

Preferably, both the 0° strain gauge and the 90° strain gauge are resistance strain gauges with temperature compensation.

A chain fault diagnosis method for a scraper conveyor based on the above chain fault diagnosis system, including three steps: chain dislocation/skip fault judgment, chain breakage fault judgment and chain seizure fault judgment:

Chain dislocation/skip fault judgment: the difference $\Delta f_{90}=f_{90}^1-f_{90}^2$ between the measurement results of the 90° strain gauges on the top end surfaces of two sprocket teeth at the same position on one sprocket is calculated; if $|\Delta f_{90}|\geq J_1$ and this is true for a number of consecutive sprocket teeth, then it is judged that the scraper is inclined; when the scraper is inclined, the difference $\Delta f_0=f_0^1-f_0^2$ between the measurement results of the 0° strain gauges on the top end surfaces of two sprocket teeth at the same position on the two sprockets on the same axis of the roller is further calculated; if $|\Delta f_0|\leq J_2$, then it is judged that chain dislocation/skip fault occurs; $J_1=0.1\times(f_{90}^1+f_{90}^2)$ and $J_2=0.1\times(f_0^1+f_0^2)$.

Chain breakage fault judgment: the difference $\Delta f_0=f_0^1-f_0^2$ between the measurement results of the 0° strain gauges on the top end surfaces of the sprocket teeth at the same position on the two sprockets on the same axis of the roller is calculated; if $|\Delta f_0|$ increases suddenly and exceeds the set threshold $J_2$ and this is true for a number of consecutive sprocket teeth, then it is judged that chain breakage fault occurs; the threshold $J_3$ can be $0.2\times(f_0^1+f_0^2)$.

Chain seizure fault judgment: when the measurement results of the 0° strain gauges on the top end surfaces of the two sprocket teeth at the same position on the two sprockets both increase suddenly and exceed the set threshold $J_4$, if the measurement results of the 0° strain gauges have no periodical and alternating changes, then it is judged that chain seizure fault occurs; the $J_4$ is 1.5 times of the measurement result of the corresponding 0° strain gauge in normal condition.

The invention has beneficial effects that coal transportation is realized through the rotating sprocket of the scraper conveyor, which drives the chain to move, and the chain operation state has a direct co-relationship with sprocket deformation. For example, in case of chain breakage, the deformation difference of two sprocket teeth in the chain traction direction increases; in case of chain seizure fault, the deformations of two sprocket teeth in the chain traction direction both increase suddenly; in case of chain dislocation/skip fault, two sprocket teeth deform greatly both in the chain traction direction and the axial direction of the scraper conveyor roller. In the invention, on the basis of the above principle, technical support is provided to the comprehensive monitoring of the chain state of the scraper conveyor by measuring the strain magnitude in different directions of the sprocket teeth in real-time, transmitting the gathered signal to the industrial control computer by means of wireless transmission and dynamically diagnosing the faults of seizure, dislocation, skip and breakage of the scraper conveyor chain on the basis of the obtained strain data.

In the figures, 1 refers to the strain rosette, 2 refers to the shielded conductor, 3 refers to the signal gathering unit, 4 refers to the wireless receiving device, and 5 refers to the industrial control computer.

DESCRIPTION OF THE EMBODIMENTS

The invention will be further explained in combination with the attached drawings.

Figure 1:
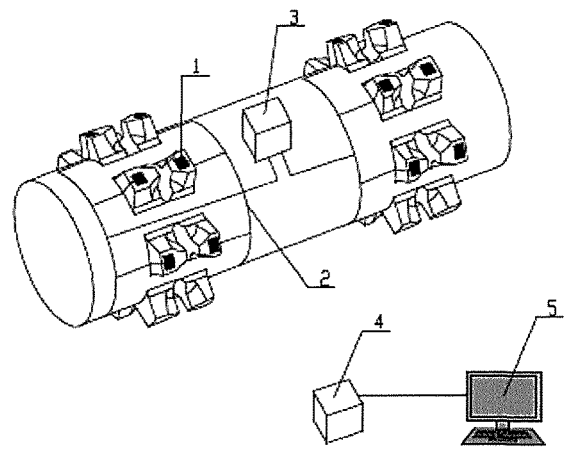
FIG. 1 shows the structural diagram of the system of the invention.
Figure 2:
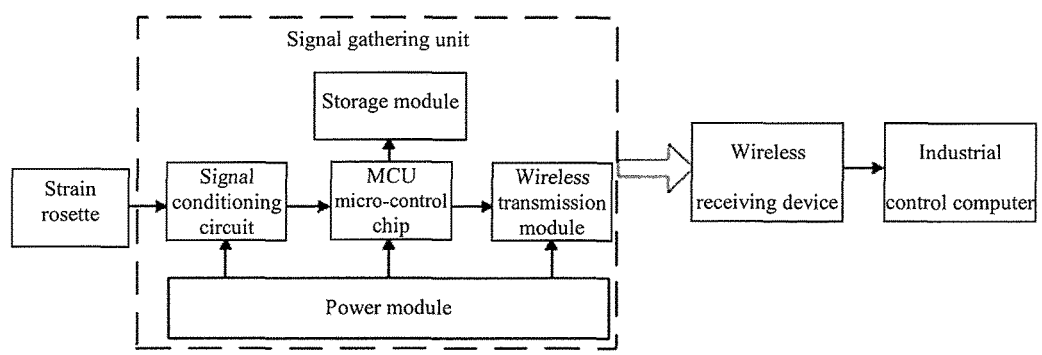
FIG. 2 shows the structural schematic diagram of the signal gathering unit of the invention.

As shown in FIGS. 1 and 2, in the chain fault diagnosis system for the scraper conveyor of the invention, the scraper conveyor includes a scraper conveyor roller and two sprockets, which are, as double-row gears, arranged at intervals on the scraper conveyor roller, and on each of which a chain is installed; the diagnosis system includes a strain rosette 1 attached on the top end surface of each sprocket tooth of the scraper conveyor, wherein the strain rosette 1 is connected with a signal gathering unit 3 fixed on the roller of the scraper conveyor through a shielded conductor 2, the wireless transmission module of the signal gathering unit 3 sends a gathered signal to a wireless receiving device 4 by means of wireless transmission, and the wireless receiving device 4 transmits the gathered signal obtained to an industrial control computer 5 through a USB interface.

The strain rosette includes a 90° strain gauge arranged in parallel with the central axis of the sprockets and a 0° strain gauge arranged vertically to the 90° strain gauge. Both the 0° strain gauge and the 90° strain gauge are resistance strain gauges with temperature compensation. The 0° strain gauge measures the deformation of the sprocket tooth in the chain movement direction; the 90° strain gauge measures the deformation of the sprocket tooth in the direction vertical to the chain movement direction.

The signal gathering unit 3 includes a power module which is connected to a signal conditioning circuit, an MCU micro-control chip and a wireless transmission module respectively, wherein the MCU micro-control chip is connected to the signal conditioning circuit, a storage module and the wireless transmission module respectively.

The chain fault diagnosis method for a scraper conveyor based on the above diagnosis system includes three steps: chain dislocation/skip fault judgment, chain breakage fault judgment and chain seizure fault judgment:

Chain dislocation/skip fault judgment: during normal operation, the tension of the two scraper conveyor chains are basically the same, and the deformation of the top end surfaces of two sprocket teeth at the same position on the same sprocket in the direction vertical to the chains is the same; the difference $\Delta f_{90}=f_{90}^1-f_{90}^2$ between the measurement results of the 90° strain gauges on the top end surfaces of two sprocket teeth at the same position on one sprocket is calculated; if $|\Delta f_{90}|\geq J_1$ and this is true for a number of consecutive sprocket teeth, then it is judged that a scraper is inclined; when the scraper is inclined, the difference $\Delta f_0=f_0^1-f_0^2$ between the measurement results of the 0° strain gauges on the top end surfaces of two sprocket teeth at the same position on the two sprockets on the same axis of the roller is further calculated; if $|\Delta f_0|\leq J_2$, then it is judged that chain dislocation/skip fault occurs; $J_1=0.1\times(f_{90}^1+f_{90}^2)$ and $J_2=0.1\times(f_0^1+f_0^2)$.

Chain breakage fault judgment: in case of chain breakage fault, the tooth deformation of the sprocket having broken chain decreases suddenly, and the tooth deformation of the sprocket having no broken chain suddenly increases; the difference $\Delta f_0=f_0^1-f_0^2$ between the measurement results of the 0° strain gauges on the top end surfaces of the sprocket teeth at the same position on the two sprockets on the same axis of the roller is calculated; if $|\Delta f_0|$ increases suddenly and exceeds the set threshold $J_3$ and this is true for a number of consecutive sprocket teeth, then it is judged that chain breakage fault occurs; the threshold $J_3$ can be $0.2\times(f_0^1+f_0^2)$.

Chain seizure fault judgment: in case of chain seizure fault, the tension of the two chains suddenly increases at the same time, and periodical and alternating change does not occur subsequently; when the measurement results of the 0° strain gauges on the top end surfaces of the two sprocket teeth at the same position on the two sprockets both increase suddenly and exceed the set threshold $J_4$, if the measurement results of the 0° strain gauges have no periodical and alternating changes, it is judged that chain seizure fault occurs; the $J_4$ is 1.5 times of the measurement result of the corresponding 0° strain gauge in normal condition.

The above description is preferred embodiments of the invention only. It shall be pointed out that many improvements and modifications can be made by one of ordinary skill in the technical field without departing from the principle of the invention, which shall also be regarded as falling within the scope of protection of the invention.

What is claimed is:

1. A chain fault diagnosis system for a scraper conveyor, comprising a scraper conveyor roller and two sprockets, which are, as double-row gears, arranged at intervals on the scraper conveyor roller, and on each of which a chain is installed, the chain fault diagnosis system comprising:

a strain rosette attached on a top end surface of each sprocket tooth of the scraper conveyor, wherein the strain rosette is connected with a signal gathering unit fixed on the scraper conveyor roller through a shielded conductor, a wireless transmission module of the signal gathering unit sends a gathered signal to a wireless receiving device by means of a wireless transmission, and the wireless receiving device transmits the gathered signal obtained to an industrial control computer through a USB interface, wherein the strain rosette comprises a 90° strain gauge arranged in parallel with a central axis of the sprockets and a 0° strain gauge arranged vertically to the 90° strain gauge.

2. A chain fault diagnosis system for a scraper conveyor according to claim 1, wherein the signal gathering unit comprises a power module which is connected to a signal conditioning circuit, an MCU micro-control chip and a wireless transmission module, respectively, wherein the MCU micro-control chip is connected to the signal conditioning circuit, a storage module and the wireless transmission module, respectively.

3. A chain fault diagnosis system for a scraper conveyor according to claim 1, wherein both the 0° strain gauge and the 90° strain gauge are resistance strain gauges with temperature compensation.

4. A chain fault diagnosis method for a scraper conveyor based on the chain fault diagnosis system as claimed in claim 1, comprising three steps: a chain dislocation/skip fault judgment, a chain breakage fault judgment and a chain seizure fault judgment, wherein the chain dislocation/skip fault judgment comprises: calculating a difference $\Delta f_{90}=f_{90}^1-f_{90}^2$, between measurement results of the 90° strain gauges on the top end surfaces of two sprocket teeth at a same position on one sprocket, wherein if $|\Delta f_{90}| \geq J_1$ and this is true for a number of consecutive sprocket teeth, then determining that a scraper is inclined, and when the scraper is inclined, further calculating a difference $\Delta f_0=f_0^1-f_0^2$ between measurement results of the 0° strain gauges on the top end surfaces of two sprocket teeth at a same position on the two sprockets on the same axis of the roller; if $|\Delta f_0| \leq J_2$, then determining that a chain dislocation/skip fault occurs, wherein $J_1=0.1\times(f_{90}^1+f_{90}^2)$ and $J_2=0.1\times(f_0^1+f_0^2)$;

the chain breakage fault judgment comprises: calculating a difference $\Delta f_0=f_0^1-f_0^2$ between the measurement results of the 0° strain gauges on the top end surfaces of the two sprocket teeth at the same position on the two sprockets on the same axis of the roller, wherein if $|\Delta f_0|$ increases suddenly and exceeds a set threshold $J_3$ and this is true for a number of consecutive sprocket teeth, then determining that a chain breakage fault occurs, wherein the set threshold $J_3$ is $0.2\times(f_0^1+f_0^2)$; and the chain seizure fault judgment comprises: when the measurement results of the 0° strain gauges on the top end surfaces of the two sprocket teeth at the same position on the two sprockets both increase suddenly and exceed a set threshold $J_4$, if the measurement results of the 0° strain gauges have no periodical and alternating changes, then determining that a chain seizure fault occurs, wherein the set threshold $J_4$ is 1.5 times of the measurement result of the corresponding 0° strain gauge in normal condition.

* * * * *